2,900,373

ETHYLENE POLYMERIZATION PROCESS

John W. Martin, Jr., Butler, Pa., assignor to Koppers Company, Inc., a corporation of Delaware No Drawing. Application March 13, 1956
Serial No. 571,135

18 Claims. (Cl. 260—94.9)

This invention is concerned with a new and improved process of preparing high molecular weight polymers of ethylene. More particularly, this invention pertains to high molecular weight polyethylene products of a polymerization process employing catalysts comprising a metal alkyl and a metal halide which can be molded or extruded without corroding the metal parts used in the process.

It is known to polymerize ethylene in the presence of a catalyst comprising a metal alkyl, for example an aluminum alkyl, and a metal halide to produce high molecular weight polyethylene products. While excellent results both with regard to yield of polyethylene and rate of polymerization are obtained when employing catalysts of the aforegoing general description, there is difficulty in molding and extruding these products due to excessive corrosion of the metal parts, for example steel dies, used in the molding or extruding.

Prior methods of producing non-corrosive polyethylene have not resulted in reducing corrosiveness to a satisfactory degree. For example, one of the more common methods involving deactivation of the catalyst with an alcohol as the prime step has limitations due to the formation of hydrogen chloride which is highly corrosive.

It is a primary objective of this invention to provide a process resulting in an improved polyethylene product having substantially no deleterious effect on the metal parts of apparatus employed in producing articles of manufacture therefrom.

In accordance with this invention substantially non-corrosive high molecular weight polyethylene can be produced by polymerizing ethylene with a catalyst of the foregoing class and thereafter treating the product obtained in accordance with the novel catalyst deactivation and washing procedures of this invention.

In one specific aspect of the present invention substantially non-corrosive polyethylene is prepared by deactivating the polymer-catalyst reaction slurry, resulting from the polymerization, with an alcohol at room temperature. The slurry is then filtered to separate polymer, the polymer refluxed with an alkali metal alkoxide, and the polymer thereafter washed several times with an alcohol, preferably at an elevated temperature. The resulting product is substantially non-corrosive to metals such as steel when tested in accordance with the method hereinafter described.

In another embodiment, comparable results are obtainable by treating the separated polymer directly with an alkali metal alkoxide followed by the series of steps outlined in the first embodiment.

The catalysts eminently suitable for producing the polyethylene products of this invention include catalysts comprising a mixture of (A) and (B), in which (A) has the general formula RR'AlX wherein R is a member selected from the group consisting of hydrogen, alkyl radicals and aryl radicals, R' is a member selected from the group consisting of hydrogen, alkyl radicals, and aryl radicals, and in which X is a member selected from the group consisting of hydrogen, halogen, alkyl radicals, alkyloxy radicals, aryloxy radicals, secondary amino radicals, secondary acid amide radicals, mercapto radicals, thiophenyl radicals, radicals of carboxylic acids and radicals of sulfonic acids, and in which (B) is a halide of a metal selected from the group consisting of metals of group IV-B, V-B, and VI-B of the periodic table including thorium and uranium.

The conditions of polymerization in processes employing the foregoing catalyst systems include temperatures under the decomposition temperature of the particular catalyst, that is in the order of 100° C. and pressures of less than 100 atmospheres. Suitably, the catalysts are slurried or dissolved in an inert solvent, such as for example, heptane, hexane, pentane, cyclohexane tetrahydronaphthalene, decahydronaphthalene, benzene, xylene, o-dichlorobenzene, chlorinated naphthalene, dibutyl-ether, and the like. In general, polymerization is accomplished by preparing a mixture of catalyst components (A) and (B) in the inert solvent and introducing ethylene while stirring until a reaction product in the form of a polymer-catalyst slurry is obtained. The product is thereafter treated in accordance with the methods of this invention to give substantially non-corrosive polyethylene.

In the preferred embodiment of this invention the polymer-catalyst slurry is deactivated with an aliphatic alcohol and the polymer separated from the slurry by filtration. The alcohols useful for this step are, in general, aliphatic alcohols such as methanol, ethanol, propanol, isopropanol, etc. The quantity of alcohol employed is governed by the size of yield and percentage of catalyst remaining in the slurry. Within practical limits sufficient alcohol is employed to remove the bulk of the included catalyst. In general, from 5 to 50 parts by volume of alcohol per 100 parts of polymer-catalyst slurry may be employed.

The alkoxides found eminently suitable in the production of the non-corrosive polyethylene of the invention comprise compounds of the general formula $$R-O-M$$

wherein R is an alkyl radical selected from the group consisting of methyl, ethyl, propyl, isopropyl, butyl, isobutyl, etc. radicals, and M is an alkali metal, for example sodium, potassium, lithium, etc. In practice the alkoxide is employed in an excess of the alcohol from which it is prepared. Additionally, the alkoxide may be used in an excess of another aliphatic alcohol in which it is soluble, an example of this being sodium t-butoxide in n-butyl alcohol. Generally, the concentration of alkoxide in the alcoholic medium may be varied within broad limits, the most important consideration being the solubility of the alkoxide at the concentration employed. The preferred concentration may range from about 2 to about 10 percent of alkoxide by weight of the alkoxide-alcohol solution.

The polyethylene products of the invention are tested for corrosiveness by observing their effect on steel. More particularly, a strip of steel of the type employed in conventional molds is held over a heated vessel containing a polyethylene sample prepared in accordance with the invention. The temperature is raised until the polymer melts and then boils with the gases or fumes being allowed to contact the strip. The strip is then observed for the degree of corrosion.

In order that those skilled in the art may have a more complete understanding of the present invention, the following examples are given by way of illustration and not by way of limitation. All parts and percentages are by weight unless otherwise specified.

Example I

A polymer-catalyst slurry is obtained by polymerizing ethylene in the presence of a catalyst comprising diethylaluminum chloride and titanium tetrachloride in a 1.1:1 mol ratio.

To 100 parts of the slurry are added 5 parts by volume of methanol. The slurry is filtered, resulting in a filter cake containing 50% by weight of volatiles. Two hundred parts by weight of the wet cake is refluxed with 350 parts by weight of a 3.5% solution of sodium methoxide in methanol for approximately 2 hours. The mixture is filtered while hot and the resulting filter cake is then treated with 350 parts by weight of methanol at room temperature and filtered. The methanol wash and filtration steps are repeated several times until the filtrate is neutral.

The polymer product is then tested for corrosiveness in accordance with the method described above. Substantially no corrosion of the steel strip is observed.

For purposes of comparisons, another 100 parts of the same polymer-catalyst slurry are treated with 5 parts by volume of methanol and the mixture filtered. The resulting polymer when tested for corrosiveness in the same test proves to be extremely corrosive to the steel strip.

Example II

Example I is repeated, substituting a polymer-catalyst slurry obtained by polymerizing ethylene with a catalyst comprising di-isobutyl aluminum chloride and titanium tetrachloride in a 1.1:1 mol ratio.

The resulting polyethylene product is substantially non-corrosive when tested in the same manner.

Example III

Example I is repeated by treating in the same manner a polymer-catalyst slurry resulting from the polymerization of ethylene in the presence of a catalyst comprising dipropyl aluminum chloride and titanium tetrachloride in similar proportions using sodium isopropoxide in isopropyl alcohol as the alkoxide.

The treated polyethylene product exhibits no evidence of corrosiveness in the corrosion test.

Example IV

Example I is repeated, substituting sodium tertiary butoxide in an excess of n-butyl alcohol for the sodium methoxide used therein. The polyethylene product similarly exhibits substantially no corrosion in the corrosion test.

Example V

The corrosive polymer treated in this example is obtained by polymerizing ethylene in the presence of a catalyst comprising diethylaluminum chloride and titanium tetrachloride in a 1.1:1 mol ratio. Five hundred parts of the polymer-catalyst slurry are filtered and the resulting dried polymer treated with a 2.7 percent solution of sodium isopropoxide in isopropyl alcohol to give a slurry. The polymer slurry is heated to approximately 80° C. and stirred at this temperature for two hours. The hot slurry is then filtered to give a light grey polyethylene cake and a clear colorless filtrate. The polyethylene cake is washed with isopropanol and is then dried to a constant weight.

Corrosiveness of the product is negligible when tested in the manner of the foregoing examples.

Example VI

Five hundred parts of a polymer-catalyst slurry resulting from the polymerization described in Example I are filtered and the resulting dried polymer treated with a 3.0 percent solution of sodium isopropoxide in isopropanol under nitrogen at room temperature. The resulting slurry is filtered under nitrogen and washed twice with isopropanol. The product proves to be substantially non-corrosive under the same conditions.

Example VII

Another 500 parts of the polymer-catalyst slurry treated in Example I are filtered and the dried polymer treated with 3.0 percent solution of sodium methoxide in methanol at room temperature. The resulting deactivated slurry is filtered in the manner of the foregoing examples and subsequently washed twice with methanol. The resulting polyethylene product is visually non-corrosive to the metal parts upon molding.

This example is repeated at the reflux temperature for both steps and the resulting polyethylene is also non-corrosive.

Example VIII

Another 500 parts of the polymer-catalyst slurry of Example I are filtered and the resulting polymer residue treated with a 5.0 percent solution of sodium ethoxide in ethanol, filtered and the residue washed twice with ethanol. The product has no visual corrosive effect on a mold upon molding a test specimen.

This example is repeated at reflux temperature for both of the treatment steps to give a polyethylene product which is non-corrosive.

Example IX

Example I is repeated with potassium isopropoxide as the alkoxide. A substantially non-corrosive polyethylene product is obtained.

For purposes of comparison a portion of polymer-catalyst slurry similar to those treated in the first of the foregoing examples is washed with various concentrations of sodium hydroxide followed by washing with distilled water until neutral. These samples upon testing for corrosion, are found to be heavily corrosive. Another portion of the same slurry is washed with ammonium hydroxide followed by washing with distilled water until neutral. No reduction in corrosive effect is observed. Still another portion of slurry is washed with ammonium carbonate followed by washing with distilled water. Only a slight decrease in corrosiveness is noted. In contrast to these methods the procedures of the invention effectively eliminate the corrosive factors from the polymer to a highly unexpected degree.

While the invention has been described with reference to particular embodiments thereof, it will be understood that in its broadest aspects the invention may be variously employed within the scope of the invention as set forth herein and in the appended claims.

I claim:

1. In the process of producing a non-corrosive high molecular weight solid polymer of polyethylene by polymerizing ethylene in the presence of a catalyst in an inert solvent, said catalyst comprising a mixture of an alkyl aluminum halide and titanium tetrachloride, the improvement which comprises treating the polymer-catalyst slurry resulting from the reaction with a lower aliphatic alcohol, filtering the slurry to obtain said solid polymer, refluxing the separated polymer with an alkaline metal alkoxide of a lower aliphatic alcohol, filtering and subsequently washing the polymer with a lower aliphatic alcohol.

2. In a process for the polymerization of ethylene to a solid polymer which comprises polymerizing ethylene in the presence of a catalyst in an inert solvent, said catalyst comprising a mixture of an alkyl aluminum halide and titanium tetrachloride, the improvement which comprises treating the resulting polymer-catalyst slurry with a lower aliphatic alcohol, filtering the slurry, refluxing the separated polymer with a deactivating agent comprising a lower alkoxide having the formula R—O—M wherein R is an aliphatic hydrocarbon radical and M is an alkali metal, filtering and subsequently washing the deactivated polymer with an alkoxide-solubilizing agent and recovering the polymer as substantially non-corrosive high molecular weight polyethylene.

3. A process for rendering non-corrosive the solid polymer obtained by polymerizing ethylene in the presence of a catalyst comprising a mixture of an alkyl aluminum halide and titanium tetrachloride, which process comprises treating said polymer with an alkaline metal alkoxide of a lower aliphatic alcohol, filtering the slurry to recover the polymer and washing the polymer with a lower aliphatic alcohol.

4. In a process for the polymerization of ethylene to a solid polymer which comprises polymerizing ethylene in the presence of a catalyst in an inert solvent, said catalyst comprising a mixture of an alkyl aluminum halide and titanium tetrachloride, the improvement which comprises treating the resulting polymer with a deactivating agent consisting of an alkoxide having the formula R—O—M dissolved in an excess of the corresponding alcohol wherein said formula R is a lower aliphatic hydrocarbon radical and M is an alkali metal, filtering the slurry and washing the deactivated polymer with an alcohol.

5. Process of claim 1 in which the alkoxide is an alkali metal alkoxide of methanol.

6. Process of claim 3 in which the alkoxide is an alkali metal alkoxide of methanol.

7. Process of claim 1 in which the alkoxide is an alkali metal alkoxide of propanol.

8. Process of claim 3 in which the alkoxide is an alkali metal alkoxide of propanol.

9. Process of claim 1 in which the catalyst comprises a mixture of diethylaluminum chloride and titanium tetrachloride.

10. Process of claim 3 in which the catalyst comprises a mixture of diethylaluminum chloride and titanium tetrachloride.

11. Process of claim 1 in which the catalyst comprises diisobutylaluminum chloride and titanium tetrachloride.

12. Process of claim 3 in which the catalyst comprises diisobutylaluminum chloride and titanium tetrachloride.

13. Process of claim 1 in which the catalyst comprises dipropylaluminum chloride.

14. Process of claim 3 in which the catalyst comprises dipropylaluminum chloride.

15. Process of claim 1 in which the alkoxide is a sodium alkoxide.

16. Process of claim 3 in which the alkoxide is a sodium alkoxide.

17. Process of claim 1 in which the alkoxide is a potassium alkoxide.

18. Process of claim 3 in which the alkoxide is a potassium alkoxide.

References Cited in the file of this patent

UNITED STATES PATENTS

| | | |
|---|---|---|
| 2,101,558 | Nealon | Dec. 7, 1937 |
| 2,185,332 | Crampton | Jan. 2, 1940 |
| 2,711,401 | Lally | June 21, 1955 |
| 2,721,189 | Anderson et al. | Oct. 18, 1955 |

FOREIGN PATENTS

| | | |
|---|---|---|
| 533,362 | Belgium | May 16, 1955 |

UNITED STATES PATENT OFFICE

CERTIFICATE OF CORRECTION

Patent No. 2,900,373 — August 18, 1959

John W. Martin, Jr.

It is hereby certified that error appears in the printed specification of the above numbered patent requiring correction and that the said Letters Patent should read as corrected below.

Column 4, line 72, strike out "a lower" and insert instead -- an --;

line 73, for "an" read -- a lower --.

Signed and sealed this 1st day of March 1960.

(SEAL)
Attest:

KARL H. AXLINE
Attesting Officer

ROBERT C. WATSON
Commissioner of Patents